May 17, 1966 J. A. PESTKA ETAL 3,251,939

ELECTRICAL COMPONENT RECEIVING CABINETS

Filed Oct. 24, 1962 6 Sheets-Sheet 1

INVENTORS:
John A. Pestka
Dominick A. Massa
Donald H. Larson
By Hofgren, Brady, Wegner, Allen & Stellman
Attys

ELECTRICAL COMPONENT RECEIVING CABINETS

Filed Oct. 24, 1962 6 Sheets-Sheet 3

ELECTRICAL COMPONENT RECEIVING CABINETS

Filed Oct. 24, 1962 6 Sheets-Sheet 4

ELECTRICAL COMPONENT RECEIVING CABINETS

Filed Oct. 24, 1962 6 Sheets-Sheet 6

United States Patent Office 3,251,939
Patented May 17, 1966

3,251,939
ELECTRICAL COMPONENT RECEIVING CABINETS

John A. Pestka, Park Ridge, and Dominick A. Massa and Donald H. Larson, Arlington Heights, Ill., assignors to Warwick Electronics Inc., a corporation of Delaware
Filed Oct. 24, 1962, Ser. No. 232,804
14 Claims. (Cl. 178—7.9)

This invention relates to cabinet structure and more particularly to electrical component receiving cabinets.

At the present time, cabinets for radio, television and housing of other electrical components may be formed of wood, metal or plastic but have various forms of mounting brackets secured to the interior thereof for mounting components by means of screws and other types of fasteners. This results in a lengthy and costly assembly operation in placement of all of the components within the cabinet.

An object of this invention is to provide a cabinet with a wall having integral mounting devices therein for mounting components that are easily and simply snapped into place.

Another object of the invention is to provide a cabinet formed of plastic material with the cabinet wall being of sufficient thickness to have the necessary rigidity and mounting devices formed integrally with said wall and of sufficient thinness to have inherent flexibility which, with the shaping thereof, permit the snap-in of components and retention thereof after they are positioned in place.

Still another object of the invention is to provide mounting devices for securely holding components within a cabinet in which said mounting devices are constructed and arranged to receive the components merely by the forcing of the components into position relative to said mounting devices and without the use of separate fastening devices.

Still another object of the invention is to provide a cabinet having front and back sections molded of plastic material with integral component mounting devices and with an integral hinge connecting the front and back sections together and providing for nesting of one section within the other during assembly of components within the cabinet.

An additional object of the invention is to provide a cabinet having component mounting devices formed integrally with the cabinet wall for mounting a variety of different electrical components such as used in a television set with an integral mounting for a circuit board in which the circuit board may have a first position facilitating assembly of components to said board and a second operative position in which the board is held in fixed relation by integral mounting devices with these devices permitting movement of the board while still being retained within the cabinet for service.

Another object of the invention is to provide a cabinet as defined in the preceding paragraphs in which the back section of the cabinet is separable from the front section and defines a driving unit, and the back section is secured to the front by latch means.

Further objects and advantages will become apparent from the following detailed description taken in connection with the accompanying drawings in which.

Figures 1, 2:
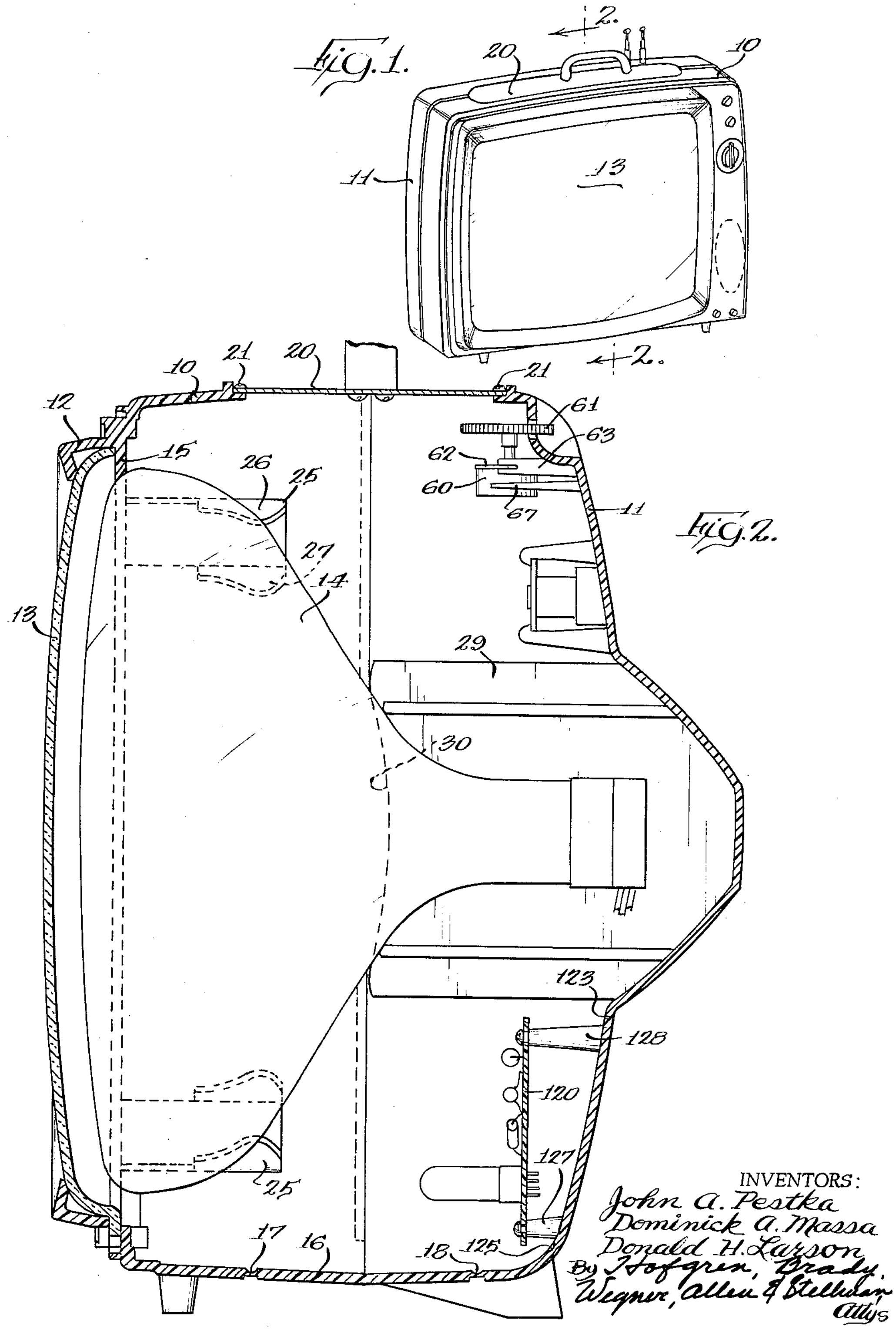
FIG. 1 is a perspective view of a cabinet embodying the invention and, as shown, is a cabinet for a television set.
FIG. 2 is a vertical section on an enlarged scale taken generally along the line 2—2 in FIG. 1.

While this invention is susceptible of embodiment in many different forms, there is shown in the drawings and will herein be described in detail an embodiment of the invention, together with a modification thereof, with the understanding that the present disclosure is to be considered as an exemplification of the principles of the invention to the embodiment illustrated. The scope of the invention will be pointed out in the appended claims.

Figure 3:
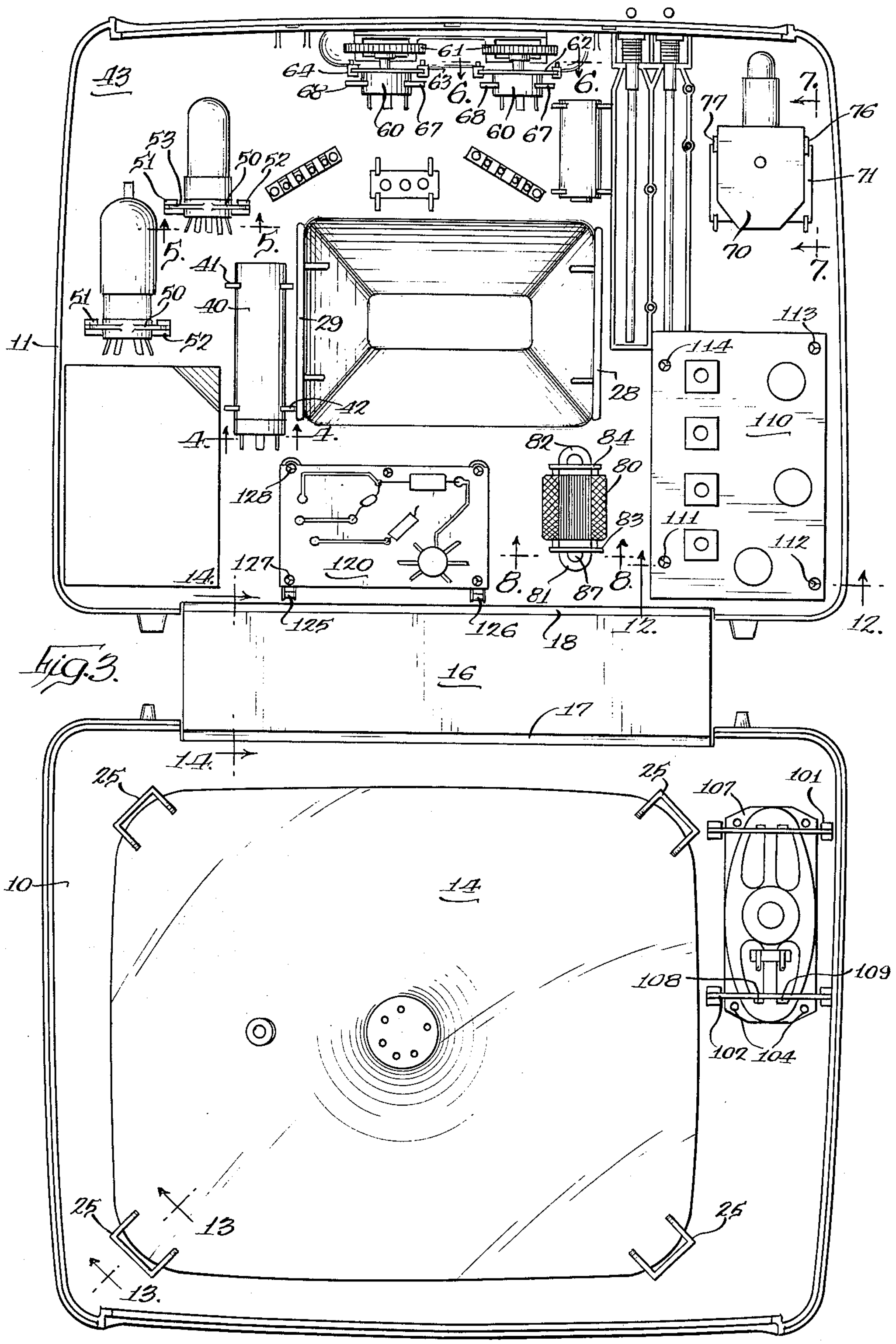
FIG. 3 is a fragmentary plan view of the cabinet shown open with the front and back sections lying in the same plane.

First, referring to FIGS. 1, 2 and 3, as an example of the cabinet, a television cabinet is shown having a front section 10 and a back section 11 with the front section 10 having a bezel 12 in which is mounted an enclosing shield 13 and the major part of a picture tube 14 with the base of the tube abutting against a mounting flange 15 extending around the interior of the cabinet.

Figure 14:
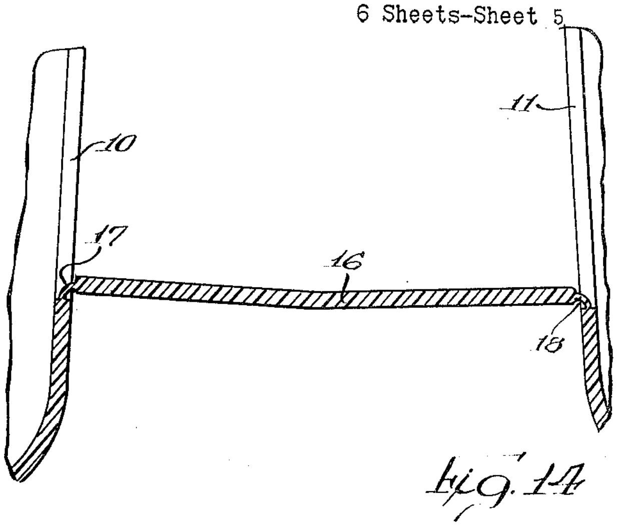
FIG. 14 is an enlarged sectional detailed view showing the hinge for the cabinet sections and taken along the line 14—14 in FIG. 3.
Figure 15:
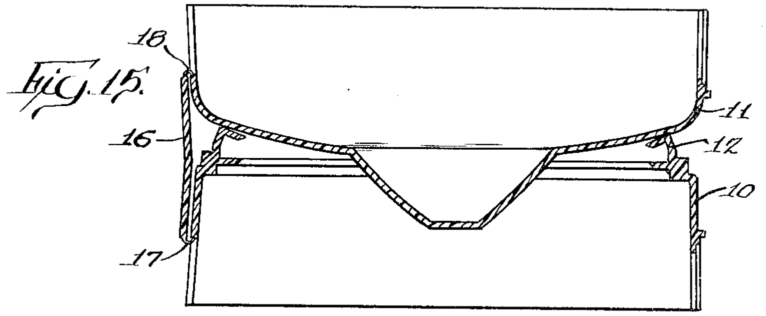
FIG. 15 is a view showing the nested relation of the front and back sections of the cabinet.

The cabinet sections 10 and 11 are molded of a suitable material to have flexible members formed integrally therewith with such material being plastic and a suitable example thereof being polypropylene. The cabinet sections are molded with an integral hinge panel 16 which has weakened sections along the lines 17 and 18 to form hinges as clearly illustrated in FIGS. 14 and 15. This integral connection avoids the requirement for the attachment of separable hinge devices and the construction permits the double fold back illustrated in FIG. 15 with the sections nested for easy access and space saving during the assembly line operations with the interior of the cabinet back section 11 being readily accessible. With a material such as polypropylene, the hinge lines 17 and 18 are formed thin and the material must be worked back and forth as soon as it is out of the mold to make the lines resilient and strong. With the cabinet sections 10 and 11 in abutting relation with each other, as shown in FIG. 2, they are held together by a connecting panel 20 extending across the top of the cabinet and being fastened to both cabinet sections as indicated at 21.

Figure 13:
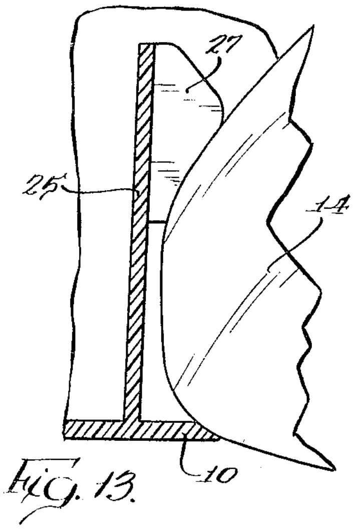
FIG. 13 is a fragmentary view showing an integral mounting member for the picture tube.

The picture tube 14 is held in position within the cabinet by means of a plurality of mounting devices 25, there being one of these associated with each corner of the tube, and being shown in FIGS. 2, 3 and 13. These mounting devices are each formed integrally with the front section wall and extend inwardly a distance sufficient to have a pair of curved fingers 26 and 27 engage the sloped backside of the tube and align the tube relative to the front cabinet section. The mounting devices are sufficiently flexible to permit the placement of a tube in position with the fingers 26 and 27 flexing and moving into position to engage the tube. The engagement of the tube by these members is not in itself sufficient for transport of the device and the cabinet back section 11 has a pair of integral plates 28 and 29 extending forwardly and having a curved leading edge indicated at 30 to engage the tube adjacent the back thereof and securely hold the tube in position.

Figure 4:
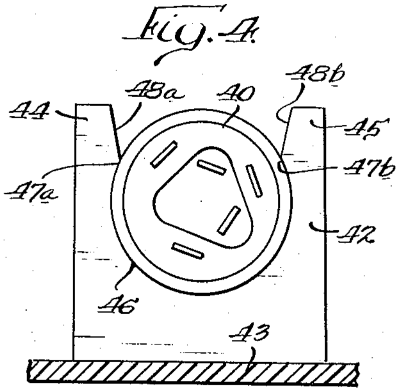
FIG. 4 is a sectional view showing the mounting of a component and taken generally along the line 4—4 in FIG. 3.

In a cabinet for an electronic device, such as a radio or other device, and particularly a television set, there are a variety of components as will be evident in FIGS. 2 and 3. The components have different shapes and sizes requiring a variety of mounting devices. FIGS. 3 and 4 show a mounting for an electrical capacitor in which the capacitor 40 has a generally cylindrical shape and the mounting device comprises a pair of plates 41 and 42 formed integrally with the cabinet back section and extending inwardly from the back section wall 43. Each of these plates has a pair of upstanding legs 44 and 45 in spaced apart relation with a partly cylindrical groove 46 formed in the plate to nestingly receive the component and have projections 47*a* and 47*b* extending above the maximum diameter and at a lesser distance apart to hold the component in position. Inwardly sloping guide parts 48*a* and 48*b*, respectively, at the top of the legs facilitate insertion of the component. Plates 41 and 42 are of sufficient thinness to have the legs 44 and 45 flexible to permit insertion of the component by a push downwardly of the component into the recess 46 as viewed in FIG. 4.

Figure 5:
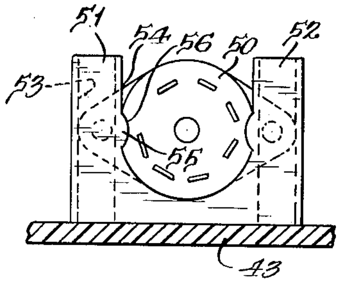
FIG. 5 is a sectional view showing the mounting of another component and taken generally along the line 5—5 in FIG. 3.

A mounting for a tube socket is shown in FIGS. 3 and 5 in which the socket 50 is received by the mounting device having a pair of upstanding legs 51 and 52. Each of these legs extends inwardly from the back section cabinet wall 43 and are formed integrally therewith. Each of the legs 51 and 52 is of a generally U-shaped cross section with a central channel 53 to receive the side flanges 54 of the tube socket and each of the legs also has a lug 55 to engage a correspondingly shaped notch 56 formed at the base of the tube socket. The legs 51 and 52 are of a dimension to have flexibility to permit the interengagement of the lugs and notches 55 and 56 to securely retain the tube socket in position in the mounting device while permitting easy insertion by a downward push as viewed in FIG. 5.

Figure 6:
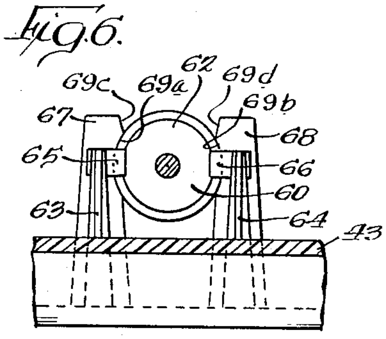
FIG. 6 is a sectional view showing the mounting of still another component and taken generally along the line 6—6 in FIG. 3.

The mounting for a variable resistor is shown in FIGS. 3 and 6 in which the resistor 60 has an adjustment knob 61 with the resistor having a flange 62 and a cylindrical body adjacent thereto. The mounting device comprises a first pair of spaced apart legs 63 and 64 formed integrally with the cabinet back section wall 43 and which have sections 65 and 66, respectively, at their upper ends formed of a U-shape cross section to receive the flange 62 of the resistor. In order to hold the resistor in position, a second pair of legs 67 and 68 similarly are formed integrally with the wall 43 and extend upwardly and are provided with opposing notches 69*a* and 69*b* to engage the cylindrical body of the resistor with sloped upper ends 69*c* and 69*d* to facilitate insertion of the resistor by a downward push exerted thereon as viewed in FIG. 6. The legs 63 and 64, as well as legs 67 and 68, are formed of sufficient thinness to be flexible to permit the insertion of the resistor while retaining the resistor in position once inserted.

Figure 7:
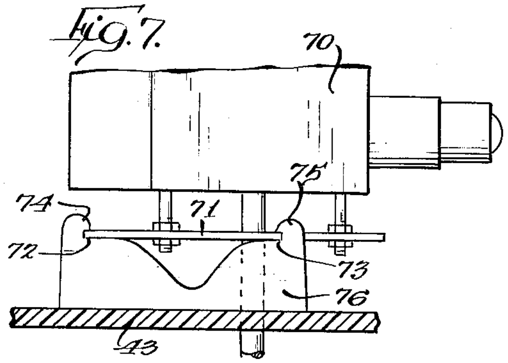
FIG. 7 is a sectional view showing the mounting of another component and taken generally along the line 7—7 of FIG. 3.

The mounting of a tuner in shown in FIGS. 3 and 7 in which the tuner 70 has a flat plate 71 engageable by the mounting device therefor. The mounting device comprises a pair of upstanding panels extending integrally from the cabinet wall 43 and formed integrally therewith. Each has a pair of spaced apart notches 72 and 73 facing each other for receiving edges of the plate with tabs 74 and 75 thereabove to engage over the plate 71 and hold it in position. These tabs have sloped upper ends to facilitate insertion of the plate 71 when the tuner is pushed downwardly as viewed in FIG. 7. The dimensions of the panels 76 and 77 are sufficient to provide a certain rigidity to the panels to make them structural strong while still being sufficiently flexible to permit outward flexing of the tabs 74 and 75 when the plate 71 is pushed down into the panel notches.

Figure 8:
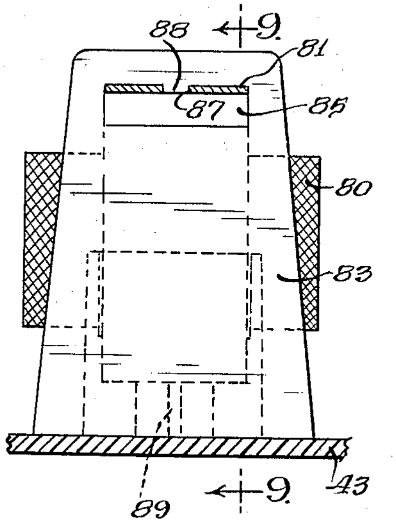
FIG. 8 is a sectional view showing the mounting of still another component and taken generally along the line 8—8 of FIG. 3 and on an enlarged scale.
Figure 9:
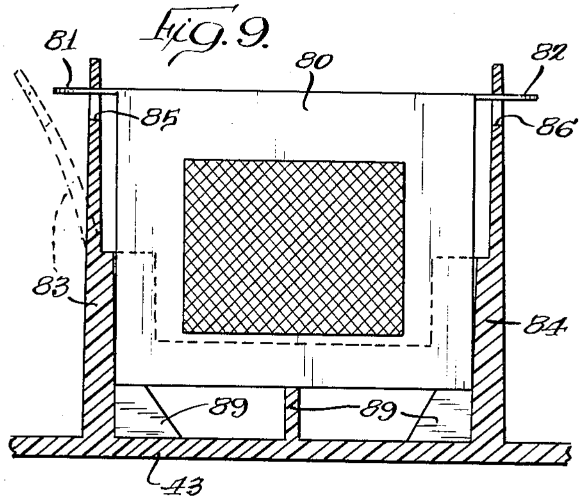
FIG. 9 is a vertical section taken generally along the line 9—9 in FIG. 8.

The mounting of a transformer is shown in FIGS. 3, 8 and 9 in which the transformer 80 has a pair of tabs 81 and 82 extending beyond the body thereof for engagement with the mounting device therefor. The mounting device comprises a pair of upstanding legs 83 and 84 formed integrally with the cabinet wall 43 and each provided with an opening 85 and 86 near the upper end thereof to receive the tabs 81 and 82, respectively. The tabs 81 and 82 each have an opening 87, and a lug 88 extends downwardly from the upper side of the leg opening 85 to engage within the opening 87 to assist in holding the transformer in position. Similar structure (not shown) on leg 84 coacts with the tab opening on tab 82. The transformer is bodily located between the legs by a series of abutments 89 extending inwardly and formed integrally with the cabinet wall 43. The legs 83 and 84 are of sufficient thinness to be flexible to permit insertion of the transformer by spreading the legs apart relative to each other, and, as shown in broken line for the leg 83 in FIG. 9.

Figures 21, 22:
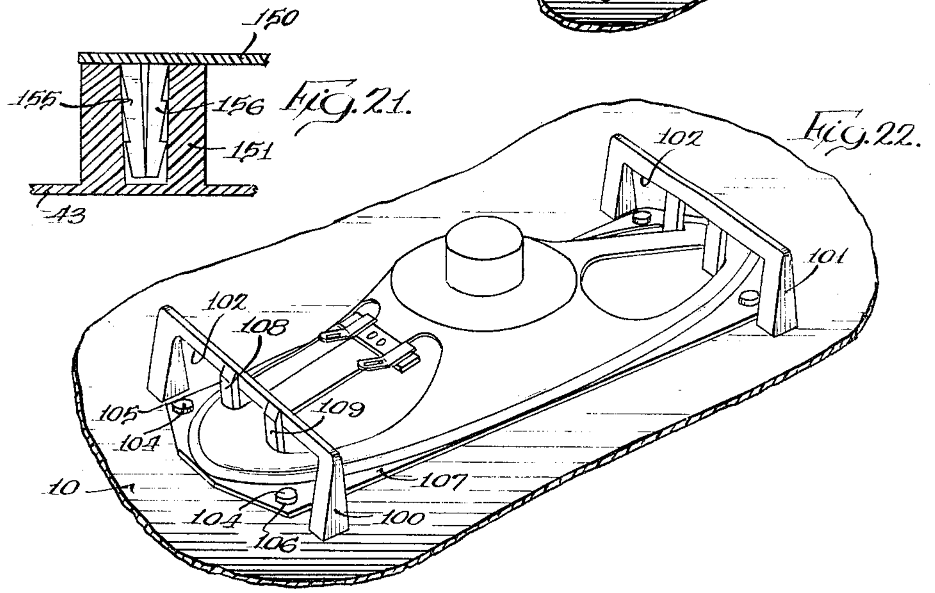
FIG. 21 is a fragmentary vertical section of the structure shown in FIG. 20 with the interfitting parts assembled.
FIG. 22 is a perspective view of the speaker mounting shown in FIG. 3.

A snap-in mounting for a speaker is shown in FIGS. 3 and 22, in which a pair of upstanding legs 100 and 101 are each provided with an interior opening 102 to receive the end parts of the speaker. A pair of lugs 104 upstand from the lower side of the opening 102 to fit within openings 105 and 106 in a plate 107 of the speaker. Further locking of the speaker in position is obtained by a pair of downwardly extending lugs 108 and 109 which engage within openings in the plate 107 of the speaker. The legs 100 and 101 are formed integrally with the cabinet front wall and are of sufficient thinness in the upper parts thereof to permit flexural movement away from each other to increase the spacing and permit insertion of the speaker.

Figure 12:
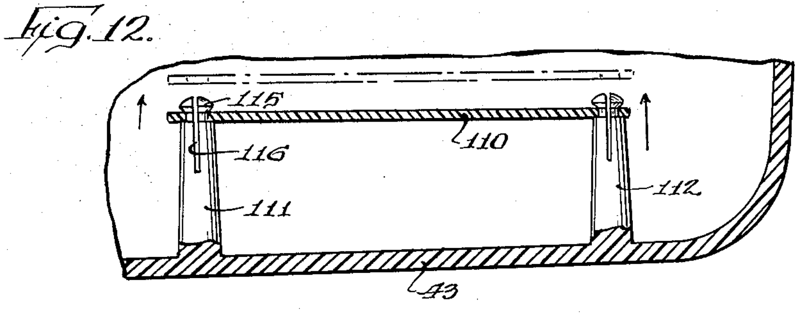
FIG. 12 is a fragmentary sectional view showing an alternate form of mounting a circuit board.

Two types of mounting are shown for circuit boards which, as known in the art, mount various electrical circuit components and have printed circuitry or jumper wires mounted thereon. A mounting for a circuit board 110 is shown in FIGS. 2, 3 and 12, which utilizes preformed openings in the four corners of the board. The mounting comprises four posts formed integrally with the cabinet back wall 43 and extending inwardly therefrom with these posts being identified at 111, 112, 113 and 114 and each of these posts having a multi-section "rosette" cap 115 formed at the upper end thereof to be flexible. This multi-section cap is formed by slotting of the upper ends of the post by slots, one of which is shown at 116, and with a second transverse slot dividing the upper end of the post into four flexible sections which have rounded upper ends. As shown in FIG. 12, a circuit board 110 may be pressed downwardly and the board openings moved past the upper ends of the post with easy removal of the board being obtained by an outward pull resulting in inward movement of the upper ends of the post. The board, when removed, is shown in broken line in FIG. 12.

Figures 10, 11:
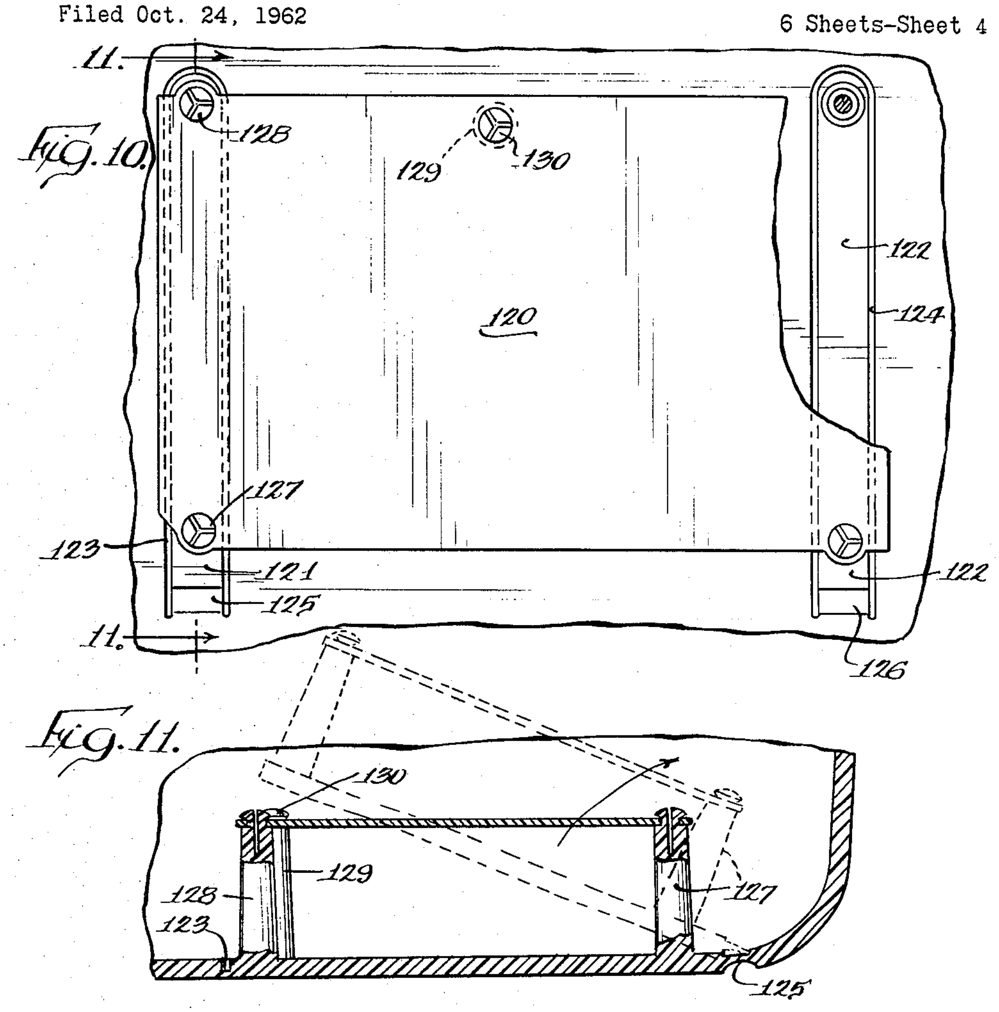
FIG. 10 is a plan view on an enlarged scale of the mounting for a circuit board shown in FIG. 3.
FIG. 11 is a section taken generally along the line 11—11 in FIG. 10.

Another mounting for a circuit board 120 is shown in FIGS. 3, 10 and 11 in which the back wall 43 has two sections 121 and 122 cut from the remainder of the wall along a line 123 and a line 124, respectively, with a thin hinge section 125 and 126, respectively. Each of the sections 121 and 122 is formed with a pair of integral upstanding posts 127 and 128 with "rosette" upper ends similar to the posts shown in FIG. 12 to receive the circuit board 120 when placed down onto the posts to removably retain the board on the posts. A locking post 129 upstands from the back wall 43 and is formed with a "rosette" upper end 130 engageable with an opening in the circuit board to lock the circuit board to the back section 10 of the cabinet. With this construction, it is possible to have access to the underside of the circuit board for service without removal from the cabinet by raising up the circuit board 120 to the broken line position shown in FIG. 11. This is permitted by flexing about the hinges 125 and 126 and upon freeing of the board from the post 129. In this movement, the sections 121 and 122 move upwardly with the board. In initially forming the consruction, the lines 123 and 124 may be not entirely cut through the back wall, but as shown in FIG. 11, and when service is first required, the lines may be cut entirely through to free the sections 121 and 122. As will be seen in FIG. 10, the lines 123 and 124 define a generally U-shape in plan to completely separate the sections 121 and 122 from the back wall.

Figure 17:
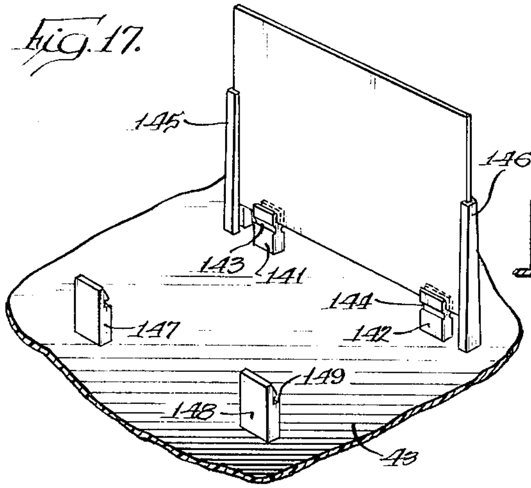
FIG. 17 is a fragmentary perspective view of another form of mounting of a circuit board with the board shown in an upright service position.
Figure 19:
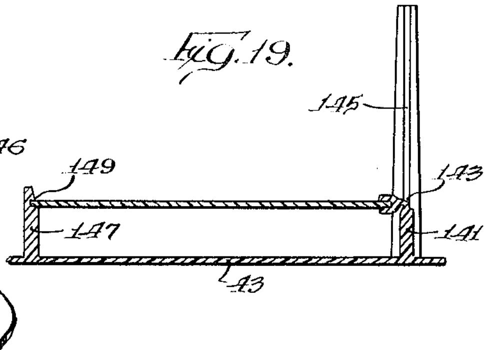
FIG. 19 is a transverse section taken generally along the line 19—19 in FIG. 18.
Figure 18:
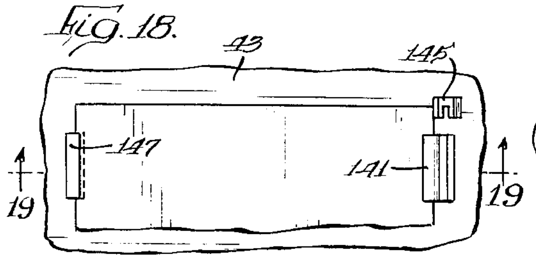
FIG. 18 is a fragmentary plan view of the board shown in an operative position.

Another embodiment of mounting for a circuit board 140 is shown in FIGS. 17, 18 and 19 in which the board has an upright position during assembly and a position parallel to the back wall 43 after assembly and when in operative position. This mounting comprises a pair of flexible legs 141, 142 extending integrally upwardly from the back wall with forked upper ends to receive an edge of the circuit board and hinged at 143 and 144 to maintain contact with the circuit board in either of the vertical or horizontal positions as permitted by the hinges. With the board supported by the hinge members, it is maintained in an upright position by a pair of flexible legs 145 and 146 extending integrally inwardly from the back wall and of a generally U-shape cross section to receive edges of the mounting board. These legs are flexible to increase the distance therebetween to permit removal of the circuit board therefrom so that it may be swung to a horizontal position in which a pair of legs 147 and 148 with notches 149 receive an edge of the circuit board opposite from that held by the hinges 143 and 144 to hold the circuit board in position. The location of the legs 145 and 146 is such as to engage the same edge of the circuit board as held by the hinges 141 and 142 when the board is in horizontal position to aid in holding the circuit board in position.

Figure 20:
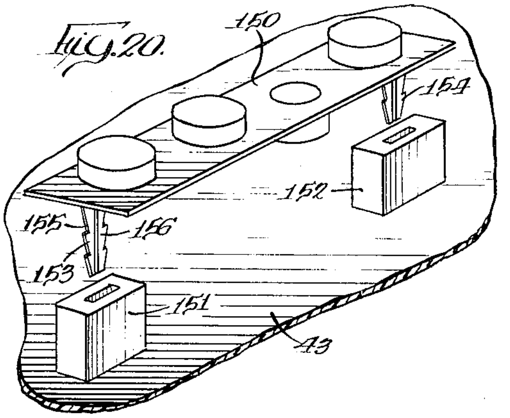
FIG. 20 is a fragmentary perspective view of a mounting for another unit with the parts shown disassembled.

Another mounting device is shown in FIGS. 20 and 21 for receiving a panel 150. This mounting device comprises a pair of blocks 151 and 152 formed integrally with the back wall 43 and extending integrally therefrom, each of which has a generally rectangular opening in cross section of decreasing width toward the back wall and in which each receive a barbed plate 153 and 154, respectively. These plates are each formed of two parts, 155 and 156, to impart flexibility to the locking member defined thereby so that the mounting of the plate 150 will cause some contraction of the legs 155 and 156 toward each other and the springiness of the legs 155 and 156 will hold the part mounted to the cabinet wall.

Figure 16:
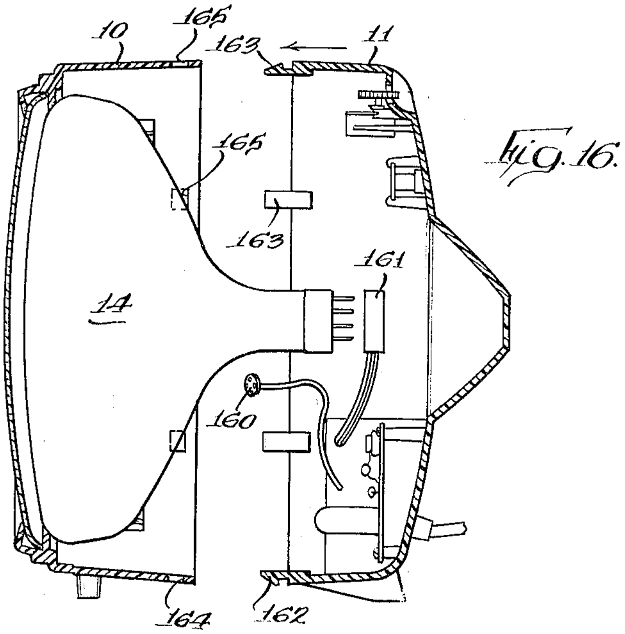
FIG. 16 is a vertical central section showing an alternate form of cabinet with a separable back section.

An alternate construction of the cabinet is shown in FIG. 16 in which the front cabinet section 10 and the rear cabinet section 11 are not connected by an integral hinge panel 16 as in the construction of FIG. 2. The rear section 11 is assembled entirely separate and, with a minimum number of connections, the back section is assembled to the front cabinet section 10. With all of the components assembled in the back section 11, two separable lead connections 160 and 161 are made to the picture tube 14 and the back section is moved toward the front section with a plurality of latch members, two of which are shown at 162 and 163, extending forwardly beyond the perimeter of the cabinet back section 11 to lie within the perimeter of the front section 10 and engage a pair of openings 164 and 165, respectively, to lock the back section to the front section. With this construction, it is possible to have a single driving unit with the components mounted on a back section which then can be universally usable with a plurality of different front sections 10 having the particular styling required for the unit.

We claim:

1. In a signal receiving device, a cabinet having a wall defining an interior cavity, said wall being formed of a plastic material of sufficient thickness to impart rigidity to said cabinet, and integral projections extending inwardly from said wall for holding components, said projections having parts thereof of a thinness sufficient to be flexible.

2. A mounting for components including a base, a pair of spaced apart integral legs upstanding from said base, said legs each having a notch to receive a portion of a component, said base and legs being formed of molded material which provides relative rigidity for the base while permitting said legs to be of sufficient thinness to be flexible.

3. A television cabinet having separate front and back sections, means on said front section for mounting a picture tube, means on said back section for mounting circuit components including members formed integrally with said back section, said back section being of a molded plastic material and the members being flexible to yieldably hold components, a releasable lead on said back section for connection to a picture tube and latch means on said sections for releasably holding the sections together.

4. A television driving unit comprising, a base, means on said base for mounting circuit components, a pair of separable leads connected to said components adapted for attachment to a television picture tube, and a plurality of latches on said base for attaching the base to a frame mounting the picture tube.

5. A television cabinet having front and back sections, means in said front section for mounting a picture tube, means in said back section for mounting the circuit components to define a driving unit for the picture tube, separable leads connecting the circuit components with the picture tube, and snap-in latches for connecting the front and back sections together.

6. A television cabinet having front and back sections and an integral intermediate double hinged section, all of said sections being molded of plastic material, said hinge section having a width sufficient to permit nesting of said back section within said front section during assembly of components in said back section.

7. A television cabinet having a back section with a wall formed of plastic material and of a thickness sufficient to be relatively rigid, first flexible means formed integrally with said wall for mounting components comprising a pair of spaced legs each having opposed notches to receive a component, second flexible means for holding a round component comprising spaced apart flexible legs integral with the wall and having lugs for engaging in notches in said round component, and means integral with said wall for holding a circuit board in a first position and a second alternate position including integral members hinged to the wall.

8. A television cabinet having a back section with a wall formed of plastic material and of a thickness sufficient to be relatively rigid, means integral with said wall for holding a circuit board in a first operative position and a second position for service including a pair of separable wall sections integrally hinged to the wall having projections holding said board, and means integral with the wall and releasably engageable with the board to hold the board and wall sections against movement.

9. A television cabinet having a back section with a wall formed of plastic material and of a thickness sufficient to be relatively rigid, means integral with said wall for holding a circuit board in a first position for assembly operations thereon including a pair of spaced flexible legs with opposed grooves for receiving opposed edges of a circuit board, a hinge member formed integrally with said wall receiving the lower edge of said board, and means for holding the board in final position after movement permitted by the hinge member including said legs against which the board abuts and lock members integral with said wall for engaging said board.

10. A television cabinet having a back section with a wall formed of plastic material and of a thickness sufficient to be relatively rigid, first flexible means formed integrally with said wall for mounting components comprising a pair of spaced panels each having opposed notches to receive a component with parts of said panel above the notches for retaining the component in association with said notches, second flexible means formed integrally with said wall for mounting a component with tabs at opposite ends comprising a pair of spaced legs extending inwardly from said wall and flexible toward and away from each other, each leg having an opening near the upper end thereof to receive one of said tabs with the body of the component therebetween, and projections on each of said legs for engaging within openings in said tabs, and means on said wall for spacing the second component from the wall, third flexible means for holding a round component comprising spaced apart flexible legs integral with the wall and having lugs for engaging in notches in said round component, means integral with said wall extending inwardly to engage the rear side of a picture tube to hold the tube in place, means integral with said wall for holding a circuit board in a first position for assembly operations thereon including a pair of spaced flexible legs with opposed grooves for receiving opposed edges of a circuit board, a hinge member formed integrally with said wall receiving the lower edge of said board, means for holding the board in final position including said legs against which the board abuts and lock members integral with said wall for reception in holes in said board, means formed integrally with said wall for receiving projections on components to hold the components in place, and means integral with said wall for holding a circuit board in a first operative position and a second positions for service including a pair of separable wall sections integrally hinged to the wall having projections holding said board and means integral with the wall and releasably engageable with the board to hold the board and wall sections against movement.

11. A cabinet having a mounting for a speaker comprising, a base of molded plastic material, a pair of spaced apart flexible legs formed integrally with and upstanding from base, means defining an opening in each leg for receiving an end portion of the speaker, a pair of lugs mounted on each leg extending downwardly into the opening to engage behind parts of the speaker frame, and a pair of lugs extending upwardly from the base into the opening to engage within openings in the speaker frame.

12. A television cabinet having a mounting for a component comprising, a pair of spaced apart flexible legs upstanding from the cabinet wall, each of said legs having an opening to receive ends of the component, the spacing of said legs being of a distance to receive the body of the component therebetween with the legs flexing outwardly during mounting to increase the space therebetween for receiving the component ends.

13. A television cabinet having a mounting for a transformer comprising, a pair of spaced apart flexible legs upstanding from the cabinet, each of said legs having an opening near the upper end thereof to receive extensions of the transformer, the spacing of said legs being of a distance to receive the body of the transformer therebetween with the legs flexing outwardly during mounting to increase the space therebetween for receiving the transformer extensions.

14. A cabinet having a mounting for a speaker comprising, a pair of spaced apart flexible legs, means defining an opening in each leg for receiving an end portion of the speaker, a pair of lugs mounted on each leg extending downwardly into the opening to engage behind parts of the speaker frame, and a pair of lugs extending upwardly into the opening to engage within openings in the speaker frame.

References Cited by the Examiner

UNITED STATES PATENTS

| | | | |
|---|---|---|---|
| 2,474,988 | 7/1949 | Sargrove | 178—7.9 |
| 2,567,829 | 9/1951 | Suthann | 178—719 |
| 2,904,617 | 9/1959 | King. | |
| 3,071,639 | 1/1963 | Mendelson et al. | |
| 3,086,078 | 4/1963 | Sharma | 178—7.9 |
| 3,087,013 | 4/1963 | Stastny et al. | 178—7.9 |

DAVID G. REDINBAUGH, *Primary Examiner.*

J. A. O'BRIEN, R. L. RICHARDSON, *Assistant Examiners.*